United States Patent
Miyazawa et al.

(10) Patent No.: US 7,077,322 B2
(45) Date of Patent: Jul. 18, 2006

(54) BAR-CODE READER

(75) Inventors: Hideo Miyazawa, Tokyo (JP); Isao Iwaguchi, Tokyo (JP); Mitsuo Watanabe, Tokyo (JP); Kozo Yamazaki, Tokyo (JP); Masanori Ohkawa, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 142 days.

(21) Appl. No.: 10/748,238

(22) Filed: Dec. 31, 2003

(65) Prior Publication Data
US 2004/0164158 A1    Aug. 26, 2004

(30) Foreign Application Priority Data
Feb. 21, 2003    (JP)    .............................. 2003-044986

(51) Int. Cl.
*G06K 7/10*    (2006.01)
(52) U.S. Cl. ..................... 235/462.16; 235/462.01; 235/462.08; 235/462.18; 235/462.19; 235/472.01
(58) Field of Classification Search ........... 235/462.16, 235/462.01, 462.08, 462.18, 462.19, 472.01
See application file for complete search history.

(56) References Cited

U.S. PATENT DOCUMENTS

| | | | |
|---|---|---|---|
| 5,463,211 A | 10/1995 | Arends et al. ............... 235/462 |
| 5,569,900 A | 10/1996 | Blöhbaum .................. 235/463 |
| 5,608,201 A | 3/1997 | Coleman, Jr. ............... 235/462 |
| 5,686,717 A * | 11/1997 | Knowles et al. ....... 235/462.07 |
| 5,801,369 A * | 9/1998 | Akeda .................. 235/462.16 |
| 5,965,864 A * | 10/1999 | Iwaguchi et al. ...... 235/462.25 |
| 6,000,616 A | 12/1999 | Spitz ..................... 235/462.16 |
| 6,296,187 B1* | 10/2001 | Shearer ................. 235/462.41 |
| 6,328,213 B1* | 12/2001 | He et al. ............... 235/462.25 |
| 6,499,662 B1* | 12/2002 | Coleman et al. ....... 235/462.18 |
| 2003/0121980 A1* | 7/2003 | Lemelson et al. ..... 235/462.08 |
| 2004/0084530 A1* | 5/2004 | McQueen et al. ..... 235/462.01 |
| 2005/0167507 A1* | 8/2005 | Swartz et al. .......... 235/472.01 |

FOREIGN PATENT DOCUMENTS

| | | |
|---|---|---|
| EP | 0 821 317 A2 | 1/1998 |
| JP | 10-91714 | 4/1998 |
| JP | 10-261043 | 9/1998 |
| JP | 2001-52104 | 2/2001 |
| JP | 2001-357348 | 12/2001 |

* cited by examiner

*Primary Examiner*—Karl D. Frech
*Assistant Examiner*—Allyson N Trail
(74) *Attorney, Agent, or Firm*—Armstrong, Kratz, Quintos, Hanson & Brooks, LLP

(57) ABSTRACT

An extractor extracts a part that is apparently a bar-code signal from a signal that is subjected to opto-electric conversion. A narrow-band differential processor forms a waveform of an edge by differentiating by using a module frequency. The module point extractor extracts the module point from the waveform. The maximum likelihood judgment processor $5f$ performs ternarizing based on a maximum likelihood method by using broader information.

15 Claims, 9 Drawing Sheets

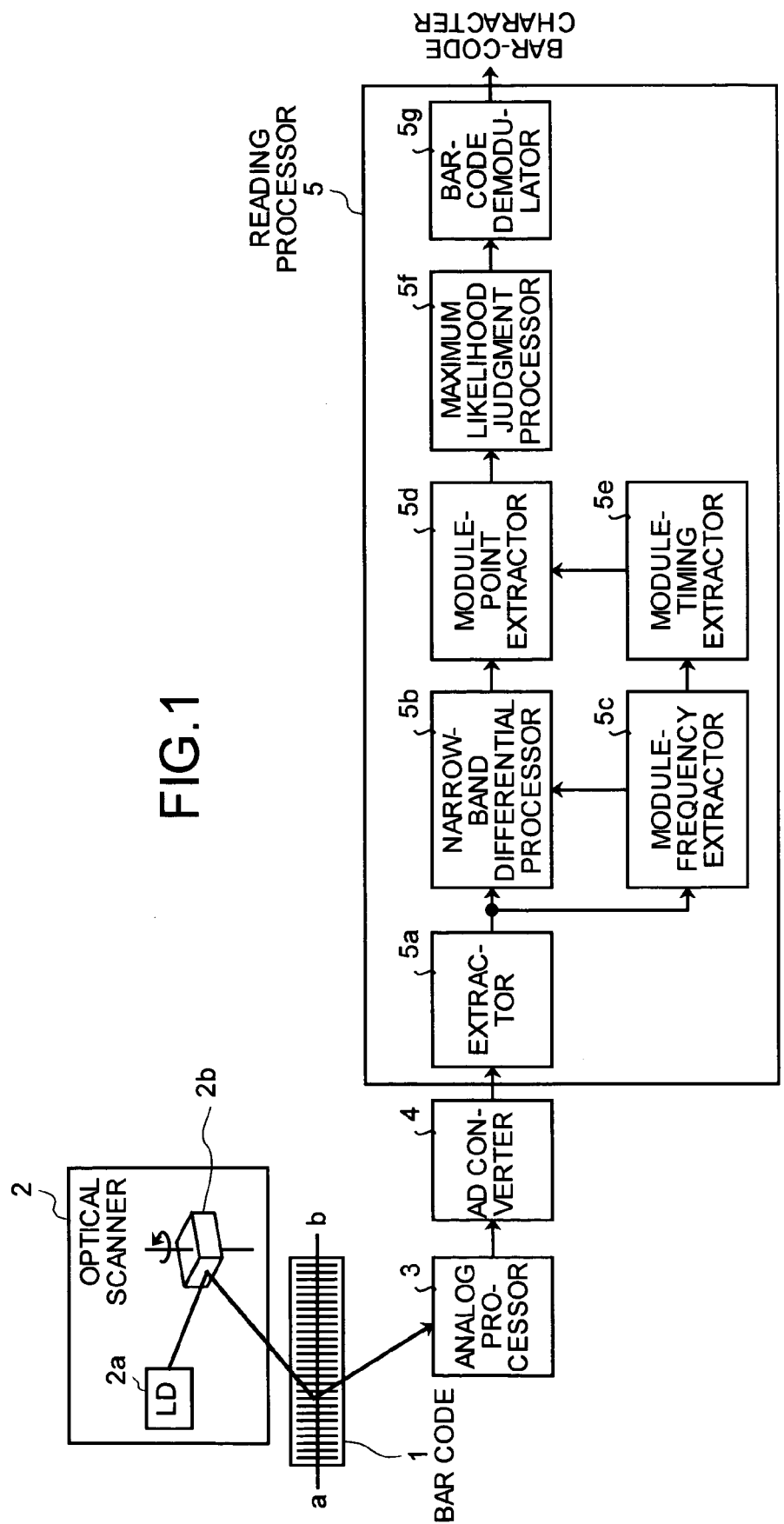

EXTRACTOR OUTPUT

NARROW-BAND DIFFERENTIAL PROCESSOR OUTPUT

MODULE-POINT EXTRACTOR OUTPUT

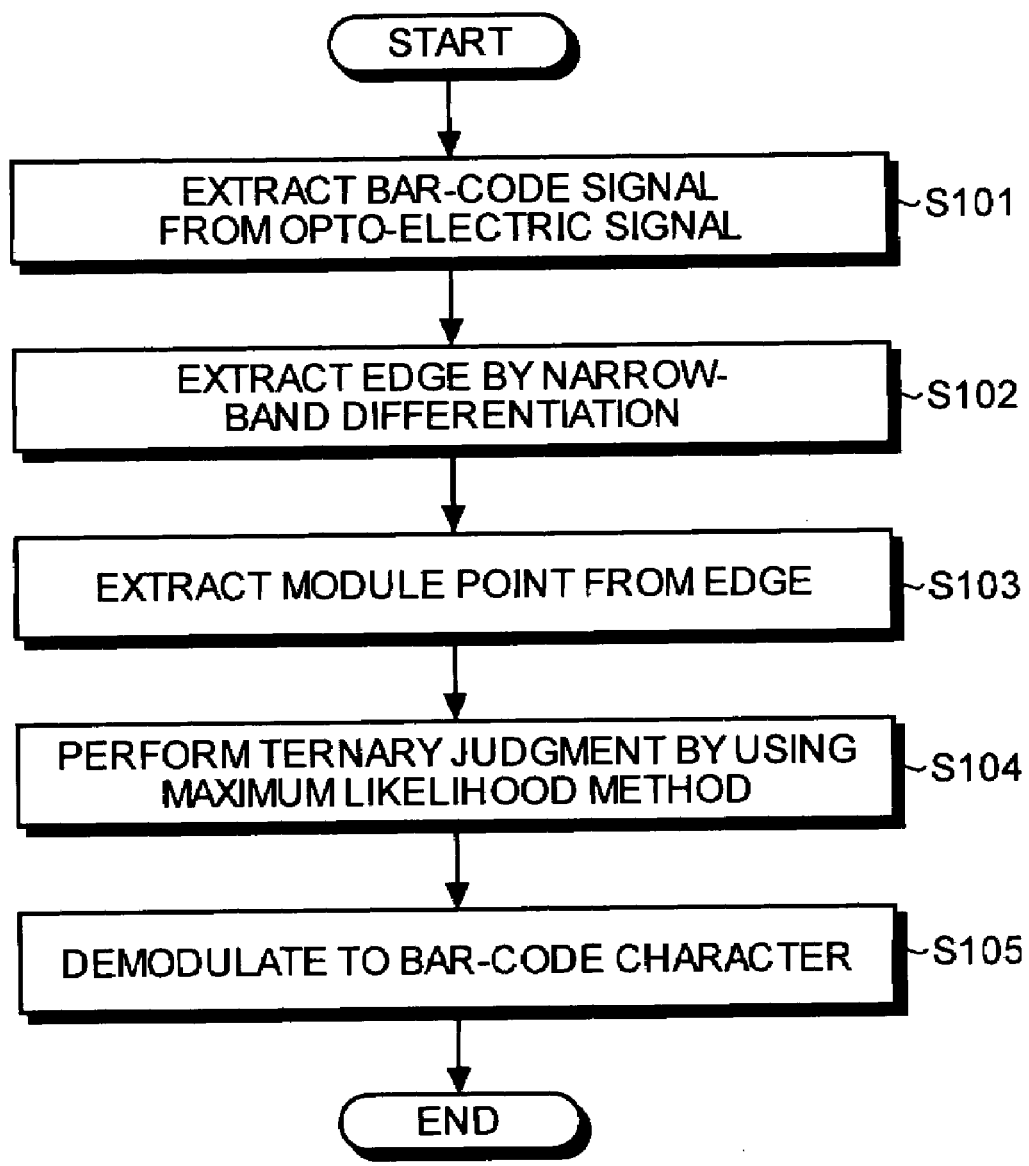

FIG.4
(a)
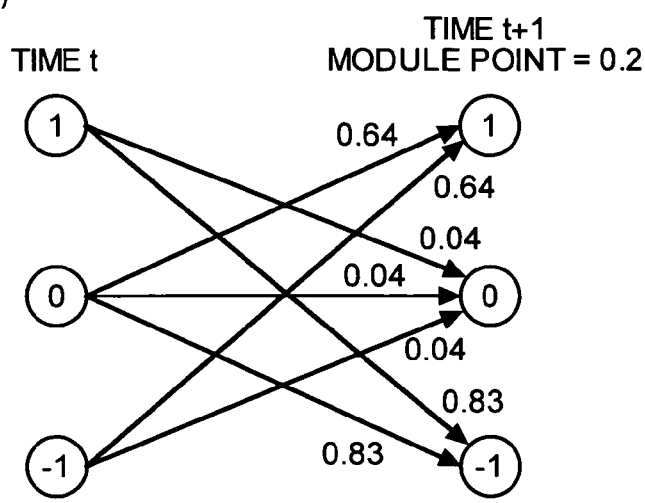
(b)
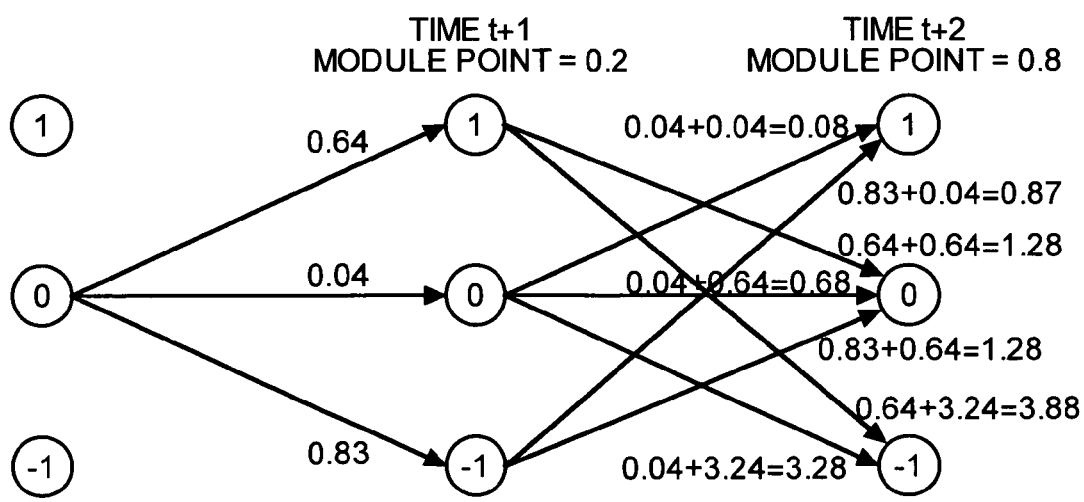

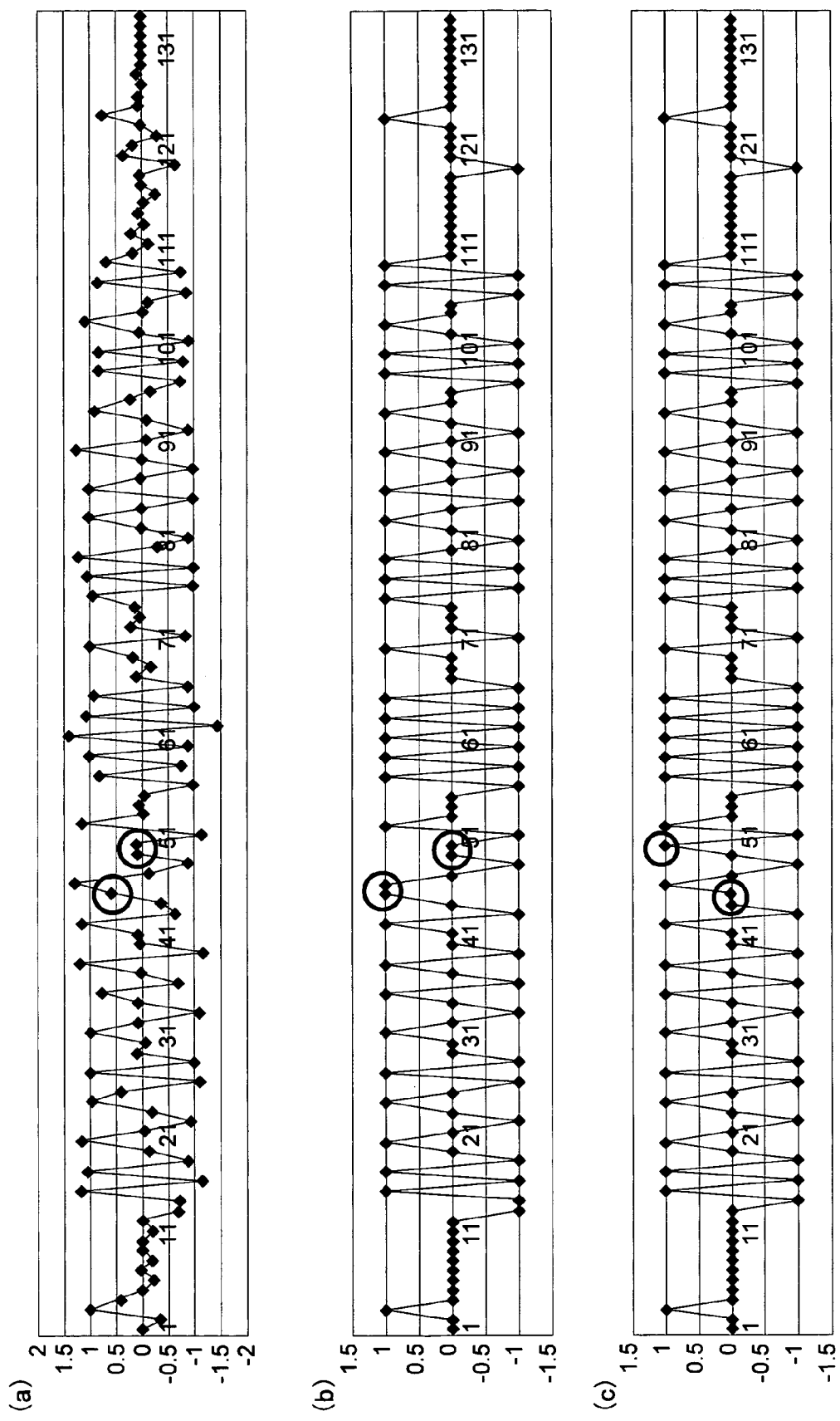

BAR-CODE READER

BACKGROUND OF THE INVENTION

1) Field of the Invention

The present invention relates to a bar-code reader.

2) Description of the Related Art

In the field of products distribution, a bar-code system is a known system. In this bar-code system, a bar code is provided to a product in advance and when the product is held up to a bar-code reader (bar-code scanner), the bar code of the product is read. By reading the bar code of a product, information of a product such as product price, product name etc. is recorded in a register Concretely, in the bar-code unit, a following series of processes is performed.

(1) A light beam is irradiated on a bar code that is formed by an array of width information of black bars and white bars and light reflected from the bar code is received. An electric signal having amplitude corresponding to an optical power of the reflected light, is generated.

(2) From the change in the amplitude of the electric signal, boundary signals (edge signals) of boundary from a white bar to a black bar and of boundary from a black bar to white bar are extracted.

(3) Distance between the edge signals that are extracted is measured as a bar-width counting value by using a clock that has a resolution power from tens to hundreds of times of the bar width.

(4) From the counting value that is measured, the width of each bar that forms the bar code is measured and a ratio of widths of the white bars and black bars is calculated Thus, in the conventional bar-code reader, if the light that is reflected from the bar code has sufficient optical power and has large amplitude, the ratio of widths of the white bars and the black bars can be known accurately. Due to this, the information of a product that is provided with a bar code can be recorded accurately in the register etc.

[Patent Document 1]

Japanese Patent Application Laid-open Publication No. Hei10-261043.

However, taking into consideration an environment in which a bar-code reader is operated practically, the light reflected from the bar code is not always sufficient. Therefore, an error occurs in reading of white bars and black bars-of the bar code.

Particularly, when each amplitude of a module point is viewed separately, in a practical environment, in most of the cases there happens to be a decrease in the amplitude. Therefore, it is difficult to make an accurate judgment of whether it is an edge '1' that changes from a black bar to a white bar, or an edge '−1' that changes from a white bar to a black bar, or a no edge area '0'.

Due to this, an efficient and accurate judgment of whether each module point is an edge that changes from a black bar to a white bar, or an edge that changes from a white bar to a black bar, or a no edge area, becomes very important. A bar-code reader in patent document 1 is an apparatus that decodes a string like a bar code that is encoded by combining a maximum likelihood method and a critical distance decoding. However, in this case, the maximum likelihood method is employed only for decoding and not for ternarizing the amplitude of each module point. Therefore, patent document 1 has not solved this problem.

SUMMARY OF THE INVENTION

It is an object of the present invention to at least solve the problems in the conventional technology.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 a block diagram of a configuration of a bar-code reader in this embodiment;

FIG. 3 is a flow chart of a processing procedure of a reading processor in FIG. 1;

FIG. 4 is an illustration (1) of maximum likelihood judgment by maximum likelihood judgment processor in FIG. 1;

FIG. 11 is an graphical representation of maximum likelihood judgment.

DETAILED DESCRIPTION

Figure 2A:
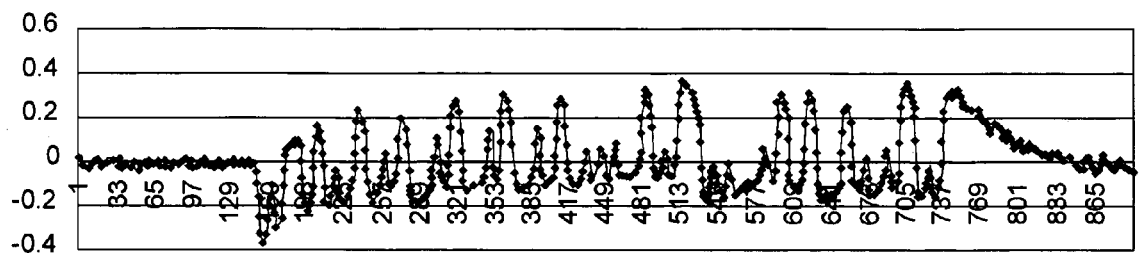
FIG. 2 illustrates examples of output data of various sections in FIG. 1.

Exemplary embodiment of a bar-code reader relating to the present invention is explained in detail below with reference to the accompanying diagrams.

Configuration of a bar-code reader in this embodiment is explained below. FIG. 1 is a block diagram of a configuration of the bar-code reader in this embodiment. As it is shown in FIG. 1, the bar-code reader includes an optical scanner 2, an analog processor 3, an AD converter 4, and a reading processor 5.

The optical scanner 2 includes an LD (laser diode) 2a and a polygon mirror 2b. The LD 2a emits a light beam and the polygon mirror 2b is formed by a mirror that reflects the light beam that is emitted from the LD 2a. The direction of reflection of the light beam is changed by rotation of the polygon mirror 2b by a motor that is not shown in the diagram. Thus, the polygon mirror 2b provides a plurality of scanning patterns. By using the optical scanner 2, the light beam that is emitted from the LD 2a, is radiated on a bar code 1 that is held on a reading surface due to the rotation of the polygon mirror 2b. The light beam is irradiated in a direction from a to b in the diagram.

A light receiving section of the analog processor 3 receives light that includes light that is reflected upon irradiating the bar code 1. The analog processor 3 performs opto-electric conversion of the light received and converts it to an electric signal that has an amplitude according to the intensity of the light and amplifies the signal according to the requirement. The AD converter 4 performs digital sampling of the analog signal that has undergone opto-electric conversion and the output from the analog processor 3, and outputs it as a digital signal.

The reading processor 5 specifies bar-code characters based on the digital signal that is received from the AD converter 4 and outputs it. The reading processor 5 includes an extractor 5a, a narrow-band differential processor 5b, a module-frequency extractor 5c, a module-point extractor 5d, a module-timing extractor 5e, a maximum likelihood judgment processor 5f, and a bar-code demodulator 5g.

The extractor 5a extracts only a signal that is apparently a bar code from the signal that is subjected to opto-electric conversion to reduce the load of processing in the latter part. Concretely, the signal that is subjected to opto-electric conversion is in the form of a wave with time on the vertical axis and amplitude on the horizontal axis. Therefore, the extractor 5a extracts a part of the waveform as shown in FIG. 2(a).

Figure 2B:
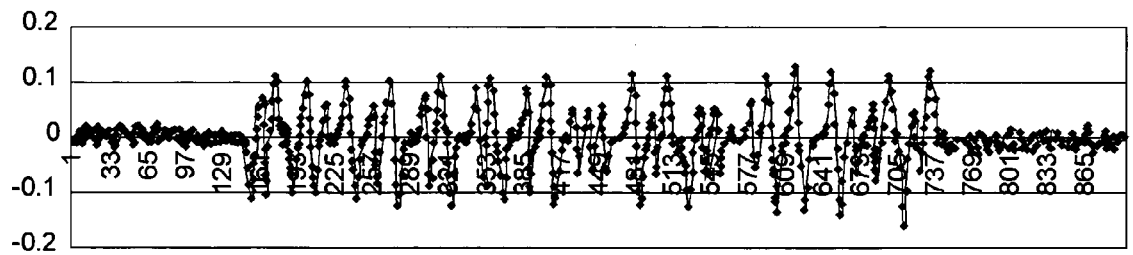

The module-frequency extractor 5c extracts, frequency that is equivalent to a basic module of a bar code signal. The narrow-band differential processor 5b performs the narrow-band differentiation of the signal that is subjected to opto-electric conversion based on the frequency equivalent to the basic module that is extracted by the module-frequency extractor 5c. Therefore, the narrow-band differential processor 5b extracts a wave form of an edge as shown in FIG. 2(b). Concretely, when a black bar in the bar code 1 is changed to a white bar, a plus (positive) edge is developed and when a white bar in the bar code 1 is changed to a black bar, a minus (negative) edge is developed.

Figure 2C:
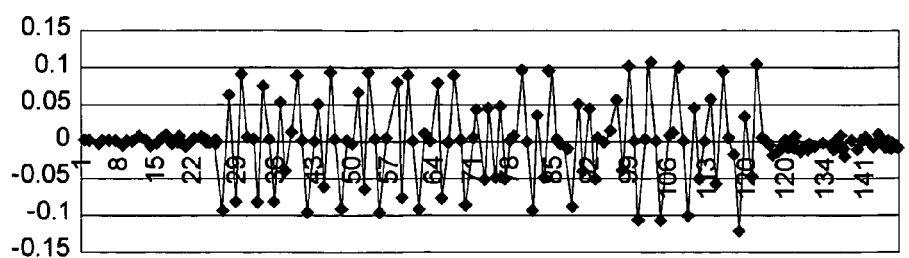

The module-timing extractor 5e extracts a timing for the extraction of a module point, based on the frequency that is equivalent to the basic module that is extracted by the module-frequency extractor 5c. The module-point extractor 5d extracts a module point according to the timing that is extracted by the module-timing extractor 5e as shown in FIG. 2(c).

The maximum likelihood judgment processor 5f is a characteristic processor of the present invention and assigns the states 1, 0, and −1 that have predetermined reference value in a plurality of continuous module points respectively. The maximum likelihood judgment processor 5f also assigns a least squared error of the amplitude of a module that is to be linked to a path that connects each module point as a path metric. The maximum likelihood judgment processor 5f ternarizes the state of a module point that is at the origin of the path linkage of the survival path, taking a path for which the sum of path metrics that have gone through predetermined path, becomes the least (minimum) as a survival path.

The reason for making the maximum likelihood judgment is as follows. When each amplitude of a module point is viewed separately, in the practical environment, in most of the cases there happens to be a decrease in the amplitude. Therefore, it is difficult to make an accurate judgment of whether it is an edge '1' that changes from a black bar to a white bar, or an edge '−1' that changes from a white bar to a black bar, or a no edge area '0'. In other words, in the maximum likelihood judgment processor, a ternary judgment of each module is performed according to a transition state between a plurality of module points rather than viewing a module point locally.

In this case, the maximum likelihood judgment processor 5f is also characterized by a point that imposes restriction on a path according to the differential characteristics. Concretely, a path from the state 1 to the state 1, a path form the state −1 to the state −1, a path from the state 1 to the state 1 via desired number of states 0, and a path from the state −1 to the state −1 via desired number of states 0 are inhibited. This is because, although a state transition from the state 1 to the state 1 implies that there exists an edge from a black bar to a black bar, in a case of bar code, the black bar not being a multivalue, this transition does not occur. In other words, there can be no shift except either from the state 1 to the state 0 or from the state 1 to the state −1. Due to the similar reason, the path from the state −1 to the state −1, a path from the state 1 to the state 1 via desired number of states 0, and a path from the state −1 to the state −1 via desired number of states 0 are inhibited.

Moreover, if a path from the state 1 to the state 0 or a path from the state −1 to the state 0 exists, the maximum likelihood judgment processor 5f leaves a path from the state 0 to the state 0. The reason for leaving the path from the state 0 to the state 0 is as follows. For example, when only the path undergoing transition from the state −1 to the state −1 via the state 0 exists, obviously the metric value is inappropriate. Therefore, a transition from the state 0 to the state 0 has to be left as a candidate.

Furthermore, although the maximum likelihood judgment processor 5f makes the least squared error of the amplitude of a module that is to be linked and the reference respectively, as a path metric, when there is a thick black bar and a thick white bar, the reference value is caused to change. The reason to perform this process is that the amplitude of a module point decreases due to a thick black bar or a thick white bar, resulting in an error in the survival path. This is explained in detail in the latter part.

The bar-code demodulator 5g specifies the combination of black bars and white bars that forms the bar code 1 and outputs bar-code characters corresponding to the specified data.

Following is the description of a processing procedure of the reading processor 5. FIG. 3 is a flow chart of the processing procedure of the reading processor 5. As it is shown in FIG. 3, in the reading processor 5, the extractor 5a extracts a part that is apparently a bar-code signal from the signal that is subjected to opto-electric conversion (step S101)

Then, the narrow-band differential processor 5b differentiates using the module frequency that is extracted by the module-frequency extractor 5c and extracts a wave form of an edge from a waveform of a part that is apparently the bar-code signal (step S102). Moreover, the module-point extractor 5d extracts a module point from a waveform of an edge by using the module-timing that is extracted by the module-timing extractor 5e using the module frequency (step S103).

Thus, upon the extraction of the module-point from the waveform of the edge, the maximum likelihood judgment processor 5f performs the ternary judgment by using the maximum likelihood method (step S104). Concretely, the maximum likelihood judgment processor 5f assigns the state 1, the state 0, and the state −1 that has a predetermined reference value to a plurality of module points respectively. The maximum likelihood judgment processor 5f provides a least squared error of the amplitude of a module that is to be linked and the reference, to a path that connects all the module points, as a path metric. Further, the maximum likelihood judgment processor 5f ternarizes the state of a module point that is at the origin of the path linkage of the survival path, taking a path for which the sum of path metrics that have undergone the predetermined path becomes the least (minimum) as a survival path.

Then, the bar-code demodulator 5i demodulates the bar-code characters that imply black bars and white bars of the bar code 1, by using the result of ternarizing by the maximum likelihood judgment processor 5f (step S105).

Figure 5:
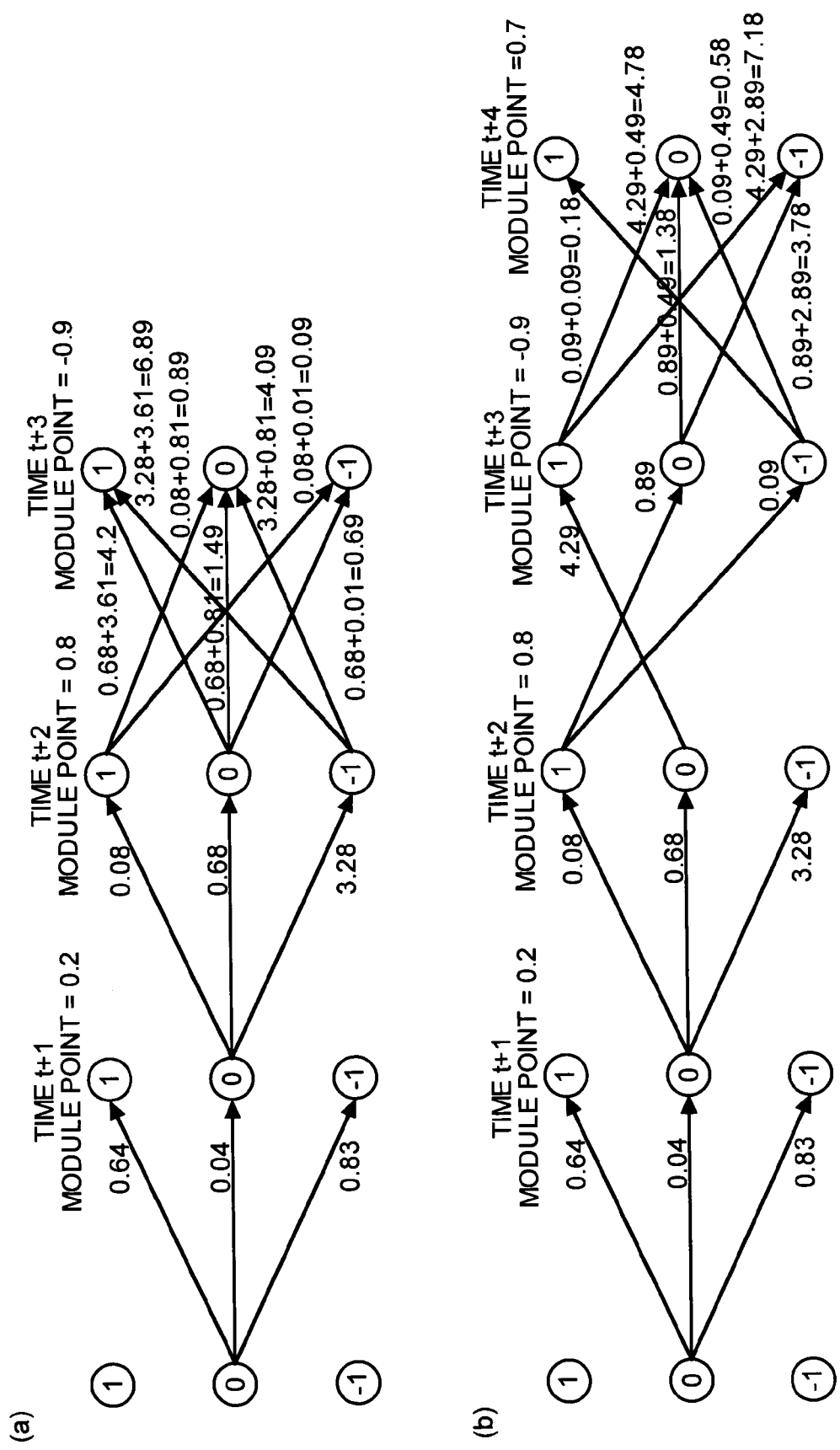
FIG. 5 is an illustration (2) of maximum likelihood judgment by maximum likelihood judgment processor in FIG. 1.
Figure 6:
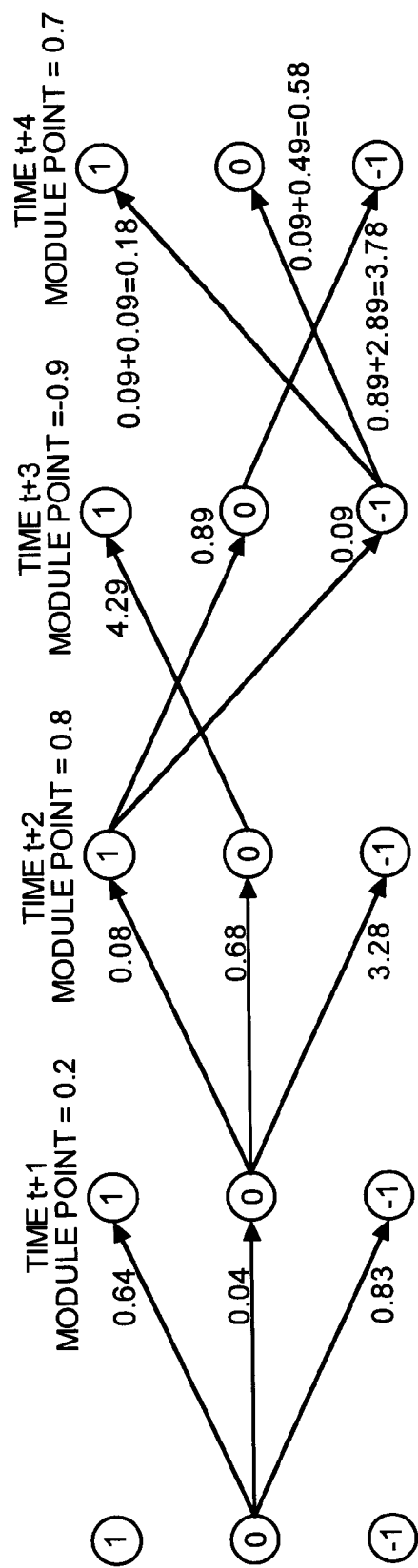
FIG. 6 is an illustration (3) of maximum likelihood judgment by maximum likelihood judgment processor in FIG. 1.

Further, the processing by the maximum likelihood judgment processor 5f that is shown in FIG. 1 is described concretely by using the diagrams-from FIG. 4 to FIG. 6. As it is shown in FIG. 4, a certain module point is associated with time t, the subsequent module point in continuation with-the module point is associated with time t+1, and the states 1, the state 0, and the state −1 are assigned respectively. Paths to each state from time t and time t+1 are taken into consideration. As already been described earlier, since the transitions from the state 1 to the state 1 and from the state −1 to the state −1 are not allowed, paths corresponding to these transitions are not developed.

Then, a path metric is assigned to each path. Here, a squared error between the amplitude of the module point of time t+1 and (reference that is assigned to) each state is assigned as a path metric. In this case, since the references of the state 1, the state 0, and the state −1 are '1', '0', and '−1' respectively and the amplitude of the module point of time t+1 is 0.2, the path metric of the path from the state 0 to the state 1 is $(1-0.02)^2=0.64$. The metric for a path of each state is assigned in a similar manner.

Further, the state transition from time t+1 to time t+2 as shown in FIG. 4(b) is taken into consideration. An unnecessary path from time t to time t+1 is deleted at this stage. Concretely, the path from the state 0 to the state 1 is left, but the path from the state −1 to the state 1 is deleted. In other words, among the paths to the same state 1, only those paths for which the path metric becomes small are left and the remaining paths are deleted. The reason for leaving the paths for which the path metric becomes small is that the small path metric implies that there is more possibility of leading to a path that has a small squared error.

Further, a path and a path metric are calculated (computed) by taking into consideration the state transition from time t+1 to time t+2 similarly as for the state transition from time t to time t+1. For a path from state t+1 to t+2, a path metric of a path that shifts to the previous state is added. The reason for this is that, finally, the state of time t is determined by using the smallest survival path of the path metric.

Further, after calculating (computing) a path and a path metric from time t+2 to time t+3 as shown in FIG. 5(a), a path and a path metric from time t+3 to time t+4 are calculated as shown in FIG. 5(b). In this case, there is not need to provide a path from the state 0 to the state 1 among the paths from time t+3 to time t+4. This is because, a path to the state 0 of time t+3 from the state 1 of time t+2 is survived and it becomes a path that shifts from the state 1 to the state 1 via the state 0 which is an inhibited condition.

As it is shown in FIG. 6, upon calculating the path metric for each path at time t+4, the path metric (leading) to the state 1 becomes 0.18, the path metric (leading) to the state 0 becomes 0.58, and the path metric (leading) to the state −1 becomes 3.78. From this, the path metric 0.18 (leading) to the state 1 becomes a metric having a minimum value.

If the time to go back (to trace back) that is determined in advance is 4, four paths are traced back from the state 1. This enables to go back (trace back) to the state of time t+3, the state −1 of time t+2, the state 0 of time t+1, and the state 0 of time t $(1 \rightarrow -1 \rightarrow 1 \rightarrow 0 \rightarrow 0)$. Therefore, judgment of the state '0' at time t is made. Similarly, in a case of time t+5 that is omitted in the diagram, a minimum path metric of a path leading to each state is obtained and four paths are traced back from this state. Therefore, judgment of the state of time t+1 is made.

In this case, the number of paths (time) that are traced back is four. However, any desirable number of paths can be set according to the processing speed and the capacity of error correction. As the time of tracing back (going back) is made longer, there is an increase in the memory that stores the past states and the processing time, whereas the capacity of error correction increases.

Figure 7:
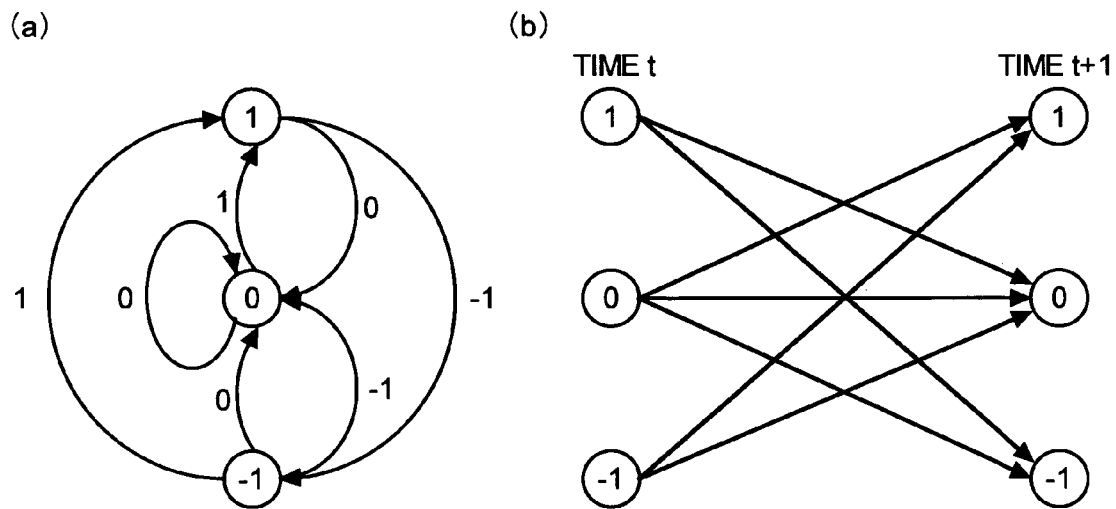
FIG. 7 is an illustration (1) indicating constraint of state transition.
Figure 8:
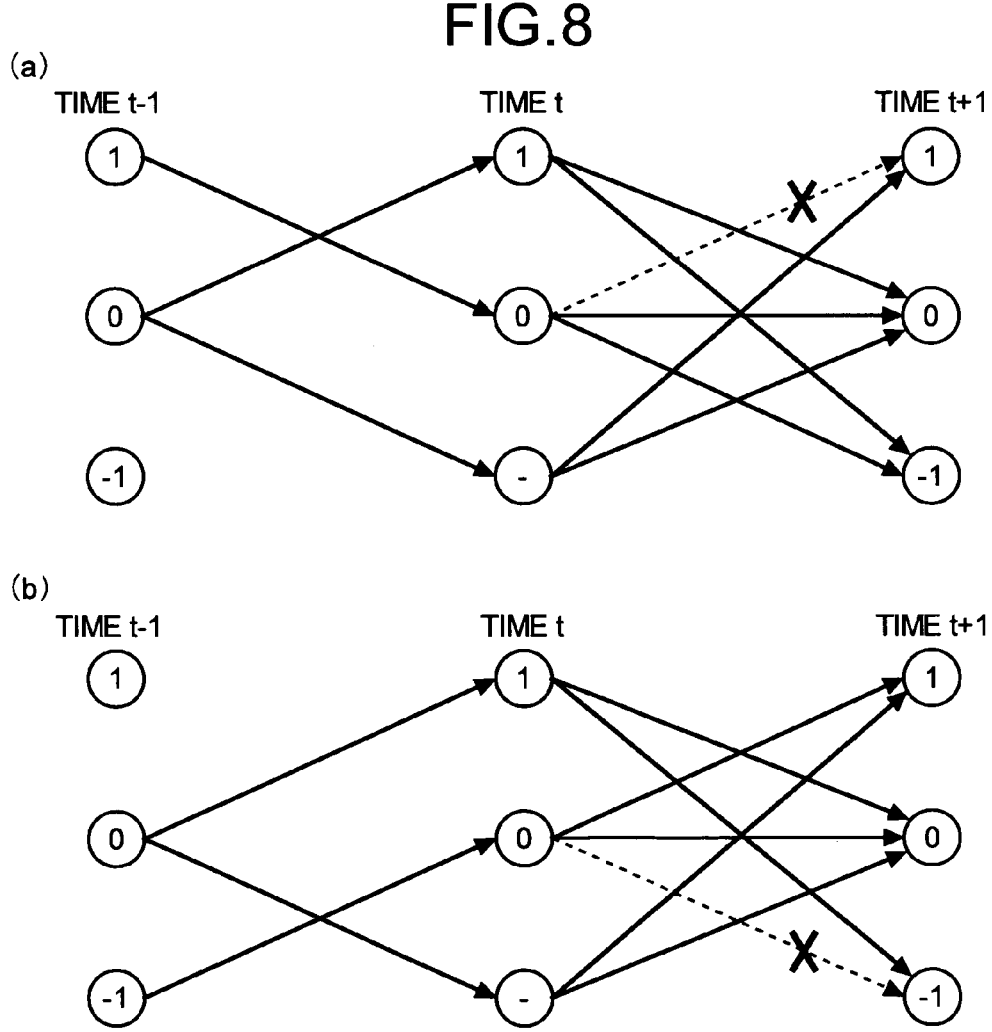
FIG. 8 is an illustration (2) indicating constraint of state transition.
Figure 9:
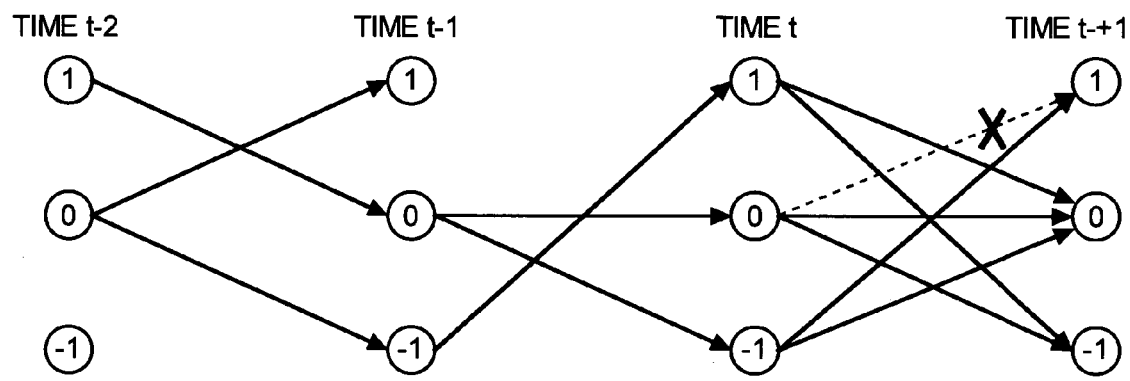
FIG. 9 is an illustration (3) indicating constraint of state transition.

The constraint on the state transition during the maximum likelihood judgment by the maximum likelihood judgment processor 5f in FIG. 1 is described while referring to FIG. 7 to FIG. 9. As it is shown in FIG. 7(a), when a state transition from a certain time to the subsequent time is taken into consideration, the state transitions from the state 1 to the state 1 and from the state −1 to the state −1 are not possible from the differential characters point of view and only a path shown in FIG. 7(a) exists.

When the state transition in three (different) times is taken into consideration, a path $1 \rightarrow 0 \rightarrow -1$ that is shown in FIG. 8(a), and a path $-1 \rightarrow 0 \rightarrow -1$ that is shown in FIG. (b) do not exist. Moreover, a path $1 \rightarrow 0 \rightarrow 0 \rightarrow 1$ that is shown in FIG. 8 and a path $-1 \rightarrow 0 \rightarrow 0 \rightarrow -1$ do not exist as well. This is because these state transitions are not possible from the differential characteristics point of view.

Figure 10:
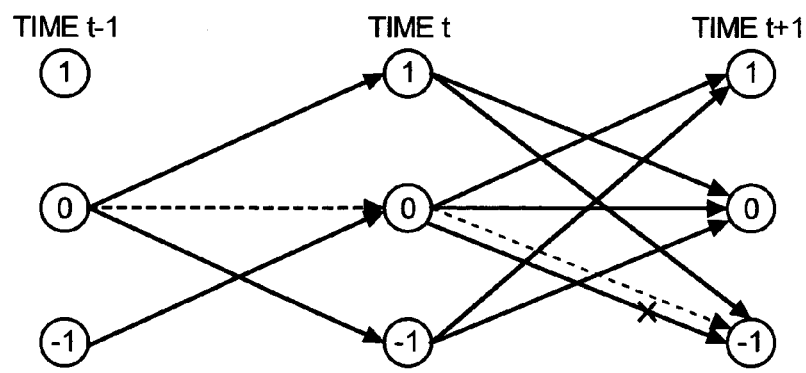
FIG. 10 is an illustration of path change to be performed when constraint is not fulfilled.

Following is the description of a path change that is performed when the maximum likelihood judgment processor 5f in FIG. 1 does not fulfill the constraint. FIG. 10 is an illustration of path change that is performed when the maximum likelihood judgment processor 5f does not fulfill the constraint. As it is shown in FIG. 10, considering the state −1 of time t−1, a path to the state 0 from time t does not exist. Moreover, from the state 0 of time t, a path to the state −1 of time t+1 can exist (can be considered). This path is deleted according to the rule, since the path $-1 \rightarrow 0 \rightarrow -1$ is formed as explained earlier.

However, the possibility that leaving of only the state −1 at time t−1 is wrong, cannot be denied. Because, a case in which the amplitude of the module point of time t has become closer to −1 rather than to 0 that is the actual amplitude can also be considered. Therefore, for this case, a path from the state 0 of time t−1 to the state 0 of time t can also be left.

Following is the description of an example of a result of ternarizing by the maximum likelihood judgment processor 5f that is shown in FIG. 1. FIG. 11 is an example of a result of ternarizing by the maximum likelihood judgment processor 5f in FIG. 1.

When a module point of a waveform of an edge that is shown in FIG. 11(a) is input, if ternary slicing is performed with 0.5 as a threshold value, the result obtained is as shown in FIG. 11(b). Whereas, when the ternarizing (ternary processing) by the maximum likelihood judgment processor 5f in the present invention is performed, the result obtained is as shown in FIG. 11(c).

When the module points that are circled in the diagram (graph) are compared, by making the maximum likelihood judgment with a broader view, the part that is misjudged by the local ternary slicing can be corrected properly.

Thus, in this embodiment, the extractor 5a extracts a part that is apparently a bar-code signal from the signal that is subjected to opto-electric conversion. The narrow-band differential processor 5b forms the waveform of the edge by differentiating by using the module frequency. The module-point extractor 5d extracts the module point from the waveform. The maximum likelihood judgment processor 5f is configured to perform ternarizing based on a maximum likelihood method by using broader information. Therefore, the maximum likelihood judgment processor 5f makes an efficient and accurate judgment of whether each of the module point is an edge that changes from a black bar to a white bar, or an edge that changes from a white bar to black bar, or a no edge area.

In this embodiment, the squared error is provided as reference '1' of the state 1, reference '0' of the state 0, and reference '−1' of the state −1. However, the value of reference is not restricted to these values and a change corresponding to thick black bar can also be made. Describing this further, when the bar code 1 is copied and in cases of a thick black bar and a thick white bar, the amplitude becomes small due to the effect of the beam diameter. Therefore, when a thick black bar or a thick white bar is judged from the dislocation of a module position or the module frequency, an adaptive change can be made like making the reference of the state 1 as '0.75'.

Moreover, in this embodiment, a case of using an optical system that irradiates a bar code by a light beam to acquire reflected light is described. However, the present invention is not restricted to this case only and can also be applied similarly for a case of using an optical system in which extraneous light such as a CCD (charged coupled device) is used.

Furthermore, while realizing the bar-code reader by a program, each section (processor) in the reading processor 5 that is shown in FIG. 1 may be stored in a ROM as a program and each program may be executed by a CPU.

As explained above, according to the bar-code reader of the present invention, amplitude of each module point of the edge data is acquired based on the module frequency of the edge data. Then the acquired amplitude of the module point is ternarized by a maximum likelihood method by using the amplitudes of the module point and a plurality of module points that are in continuity with it. This enables to make an efficient and accurate judgment of whether each module point is an edge that changes from a black bar to a white bar, or an edge that changes from a white bar to a black bar, or a no edge area.

Moreover, according to the bar-code reader of the present invention, a state 1, a state 0, and a state −1 having a predetermined reference value is assigned to a plurality of module points respectively. Further, a path that connects all the module points is assigned with a least squared error of the amplitude of a module that is to be linked and the reference respectively, as a path metric. A path for which the sum of path metrics that have undergone the predetermined number of paths becomes the least (minimum), is considered as a survival path. The state of a module point that is at the origin of the path linkage of the survival path is ternarized as a value of the module point. This enables to perform the maximum likelihood method efficiently.

Furthermore, according to the bar-code reader of the present invention, a path from the state 1 to the state 1 and a path from the state −1 to the state −1 are inhibited. This enables to reduce subjected paths based on differential characteristics, thereby performing the process efficiently.

Moreover, according to the bar-code reader of the present invention, a path from the state 1 to the state 1 via desired number of states 0 and a path from the state −1 to the state −1 via desired number of states 0 are inhibited. This enables to reduce subjected paths based on differential characteristics, thereby performing the process efficiently.

Furthermore, according to the bar-code reader of the present invention, when there exists a path from the state 1 to the state 0 or a path from the state −1 to the state 0, a path from the state 0 to the state 0 is left. This enables to prevent the decline in accuracy due to a pass error.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar-code reader that acquires a signal strength of a reflected light that is reflected from black bars and white bars that form a bar code, extracts edge data that changes the signal strength from a black bar to a white bar and vice versa, ternarizes the edge data that is extracted, and decodes bar-code characters by using a result of the ternarizing, comprising:

an amplitude acquiring unit that acquires an amplitude of each module point of the edge data based on a module frequency of the edge data; and a ternarizing processor that ternarizes the amplitude of the module point by a maximum likelihood method by using amplitudes of a module point and a plurality of module points that are in continuation with the module point, wherein the ternarizing processor assigns a state 1, a state 0, and a state −1 that have predetermined reference values respectively, to a plurality of module points in continuity, assigns a least squared error to the amplitude of a module that is to be linked to a path that connects each module point, as a path metric, and ternarizes a state of a module point that is at the origin of a path linkage of a survival path, taking a path for which a sum of path metrics that have gone through a predetermined path becomes minimum as a survival path.

2. The bar-code reader according to claim 1, wherein the ternarizing processor inhibits a path from the state 1 to the state 1 and a path from the state −1 to the state −1.

3. The bar-code reader according to claim 1, wherein the ternarizing processor inhibits a path from the state 1 to the state 1 via a desired number of the states 0, and a path from the state −1 to the state −1 via a desired number of the states 0.

4. The bar-code reader according to claim 1, wherein the ternarizing processor leaves a path from the state 0 to the state 0, when there is a path from the state 1 or the state −1 to the state 0.

5. The bar-code reader according to claim 1, wherein, when there is any one of a thick black bar and a thick white bar, the ternarizing processor changes the reference of any one of the state 1 and the state −1 according to a thickness of any one of a thick black bar and a thick white bar.

6. A method of reading a bar code in which a signal strength of a reflected light that is reflected from black bars and white bars that form a bar code is acquired, edge data that changes the signal strength from a black bar to a white bar and vice versa, is extracted, the edge data that is extracted is ternarized, and bar-code characters are decoded by using a result of the ternarizing, comprising:

acquiring an amplitude of each module point of the edge data based on a module frequency of the edge data; and ternarizing the amplitude of the module point by a maximum likelihood method by using amplitudes of a module point and a plurality of module points that are in continuation with the module point, wherein at the ternarizing, a state 1, a state 0, and a state −1 that have predetermined reference values respectively, are assigned to a plurality of module points in continuity, a least squared error is assigned to the amplitude of a module that is to be linked to a path that connects each module point, as a path metric, and a state of module point that is at the origin of a path linkage of a survival path is ternarized, taking a path for which a sum of path metrics that have undergone through predetermined path becomes the least as a survival path.

7. The method of reading a bar code according to claim 6, wherein a path from the state 1 to the state 1 and a path from the state −1 to the state −1 are inhibited at the ternarizing.

8. The method of reading a bar code according to claim 6, wherein a path from the state 1 to the state 1 via a desired number of the states 0, and a path from the state −1 to the state −1 via a desired number of the states 0 are inhibited at the ternarizing.

9. The method of reading a bar code according to claim 6, wherein when there is a path from any one of the state 1 and the state −1 to the state 0, a path from the state 0 to the state 0 is left at the ternarizing.

10. The method of reading a bar code according to claim 6, wherein when there is any one of a thick black bar and a thick white bar, the reference of any one of the state 1 and the state −1 is changed according to a thickness of any one of a thick black bar and a thick white bar at the ternarizing.

11. A bar-code reading computer program that includes a plurality of computer readable instructions that control a bar-code reader that acquires a signal strength of a reflected light that is reflected from black bars and white bars that form a bar code, extracts edge data that changes the signal strength from a black bar to a white bar and vice versa, ternarizes the edge data that is extracted, and decodes bar-code characters by using a result of the ternarizing, wherein the instructions, when executed by the computer, cause the computer to perform: acquiring an amplitude of each module point of the edge data based on a module frequency of the edge data; and ternarizing the amplitude of the module point by a maximum likelihood method by using amplitudes of a module point and a plurality of module points that are in continuation with the module point, wherein at the ternarizing, a state 1, a state 0, and a state −1 that have predetermined reference values respectively, are assigned to a plurality of module points in continuity, a least squared error is assigned to the amplitude of a module that is to be linked to a path that connects each module point, as a path metric, and a state of module point that is at the origin of a path linkage of a survival path is ternarized taking a path for which a sum of path metrics that have gone through predetermined path becomes the least as a survival path.

12. The bar-code reading computer program according to claim 11, wherein a path from the state 1 to the state 1 and a path from the state −1 to the state −1 are inhibited at the ternarizing.

13. The bar-code reading computer program according to claim 11, wherein a path from the state 1 to the state 1 via a desired number of the states 0, and a path from the state −1 to the state −1 via a desired number of the states 0 are inhibited at the ternarizing.

14. The bar-code reading computer program according to claim 11, wherein when there is a path from any one of the state 1 and the state −1 to the state 0, a path from the state 0 to the state 0 is left at the ternarizing.

15. The bar-code reading computer program according to claim 11, wherein when there is any one of a thick black bar and a thick white bar, the reference of any one of the state 1 and the state −1 is changed according to a thickness of any one of a thick black bar and a thick white bar at the ternarizing.

* * * * *